Sept. 19, 1950          A. NICOLI          2,522,632

EXTRUDING DEVICE FOR SHAPING PLASTIC MATERIAL

Filed May 11, 1948

INVENTOR.
Arthur Nicol
BY Harold E. Cole
Attorney

Patented Sept. 19, 1950

2,522,632

UNITED STATES PATENT OFFICE 2,522,632

EXTRUDING DEVICE FOR SHAPING PLASTIC MATERIAL

Arthur Nicoli, Taunton, Mass.

Application May 11, 1948, Serial No. 26,468

5 Claims. (Cl. 107—14)

1

This invention relates to an extruding device for machines to sheet dough, such as machines for forming macaroni dough into sheet-like ribbons for use in preparing ravioli, tortellini, agnelotti, lasagne and like articles of food.

In machines for making different shapes of dough the dough is fed by a propeller screw from a hopper into one end of a chamber, and the other end of such chamber is provided with an extrusion head having formed therein an off-center opening or openings of a size equal in cross section to the cross-sectional area of the shape to be formed. With my present type of extrusion head, I provide a central opening at the exit end of a tapered, feeding chamber, and such chamber communicates with a cylindrical, receiving chamber to which the dough is delivered by the propelling screw of the machine.

An object of my invention is an improved form of extrusion head for making ribbon-like sheets or strips of dough or other like plastic material which head has an opening centrally positioned with respect to the axis thereof.

The foregoing and other objects which will appear as the nature of the invention is better understood, may be accomplished by a construction, such as is disclosed by the drawings and specification. The nature of the invention is such as to render it susceptible to various changes and modifications, and, therefore, I am not to be limited to said disclosures; but am entitled to all such changes therefrom as fall within the scope of my claims.

Figure 1:
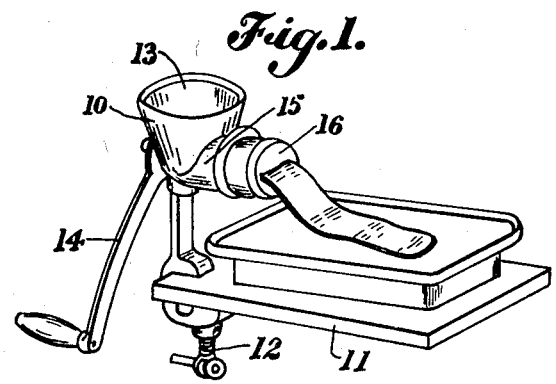
Figure 1 is a perspective view of a hand operated machine for expelling dough, with my improved extrusion device attached at the front thereof.

Referring to the drawing, 10 designates a hand-operated machine for forming dough into sheet-like ribbons, and adapted to be secured to a bench, or table top 11, by means of the screw member 12. This machine has a feeding opening 13, at the bottom of which is the usual propeller screw (not shown) rotatable by means of the crank 14. The dough or other plastic material is forced through the hollow body member

2

15 on which is screwed my extrusion device 16.

Figure 2:
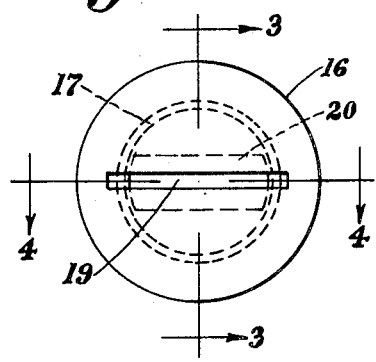
Figure 2 is a front elevational view of my improved extruding device.
Figure 3:
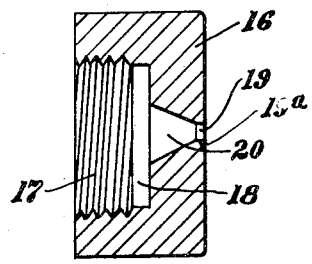
Figure 3 is a sectional view taken on the line 3—3 of Figure 2, and looking in the direction of the arrows.
Figure 4:
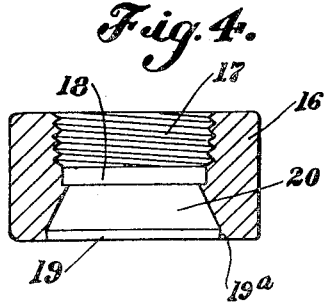
Figure 4 is a sectional view, taken on the line 4—4 of Figure 2, and looking in the direction of the arrows.

Referring to Figures 2, 3 and 4, my extrusion device 16 has its rear portion interiorly drilled and tapped to provide an attaching portion 17 by means of which the extrusion device 16 may be secured in position on the body member 15 of the machine. Within my device 16 at the front end of the threads 17 is a portion 18 providing a cylindrical, dough-receiving chamber which preferably is of a diameter substantially equal to the passage through the body member 15.

Formed in my device 16 and extending inwardly from the outer face thereof is an extruding portion 19a having a passage 19 which is shown as a narrow, oblong-shaped slit of uniform width throughout. The area of this passage 19 is equal to the cross-sectional area of the ribbon sheet formed as it is extruded through it. This sheet is usually very thin, preferably being about .028 of an inch in thickness. The depth of this extruding portion 19a and passage 19 may be anything desired. I have shown it as about $\frac{1}{16}$ of an inch which is sufficient for practical purposes.

Formed in my device 16 rearwardly from the ends and sides of the innermost part of said extruding portion 19a is a feeding chamber portion 20 tapering inwardly perpendicular to its width, preferably being V-shaped as shown. It communicates with said receiving chamber 18. In this feeding chamber 20 the dough is compressed somewhat prior to its passing therefrom through said extruding passage 19 to thereby produce a firm, homogeneous ribbon-like sheet of dough. This feeding chamber 20 preferably increases in width in a direction towards said extruding passage 19 as shown in Figure 4 of the drawings. Said extruding passage 19 is centrally located with respect to the body of the extrusion head 16 and is of uniform width as shown in the drawing, hence a sheet of dough may be formed practically as wide as said extruding passage 19.

In operation, the dough, or other plastic material is placed in the feeding opening 13, and rotation of the crank 14 forces the dough, or other material through the hollow body member 15, and into the receiving chamber 18, thence through the tapered feeding chamber 20 and then through the extruding passage 19.

Said receiving chamber portion 18 and feeding chamber portion 20 serve as a continuous passage for the dough on its way to the extruding passage 19. I prefer to have said receiving chamber 18 of substantially the same size as the attaching portion 17 so that the dough will have this passage to move freely through prior to entering the V-shaped feeding passage 20.

While my device could be made of separate parts connected together I find it preferable to form it of a unitary piece of material, such as metal.

What I claim is:

1. An extruding device for forming plastic dough into definite shape comprising an attaching portion, a receiving chamber portion forwardly thereof, a feeding chamber portion forwardly of and in communication with said receiving chamber, and an extruding portion forwardly of and in communication with said feeding chamber and extending to the front of said device and having an oblong-shaped extruding passage therein, extending across the axial center thereof, said feeding chamber being more constricted where it communicates with said extruding portion than where it communicates with said receiving chamber portion and tapering rearwardly perpendicularly to its width, said extruding passage extending an appreciable extent forwardly from the forward end of said feeding chamber.

2. An extruding device for forming plastic dough into definite shape, comprising an attaching portion having an interiorly screw-threaded portion, a cylindrical receiving chamber portion forwardly thereof, a feeding chamber portion forwardly of and in communication with said receiving chamber having a truncated, V-shaped passage, and an extruding portion having an extruding passage forwardly of and in communication with the smaller portion of said feeding chamber passage and extending to the front of said device, said extruding passage extending across the axial center of said extruding portion an appreciable extent forwardly from the forward end of said feeding chamber.

3. An extruding device for forming plastic dough into definite shape comprising an attaching portion having an interiorly screw-threaded portion, a cylindrical receiving chamber portion forwardly thereof, a feeding chamber portion forwardly of and in communication with said receiving chamber having a truncated, V-shaped passage, and an extruding portion having an extruding passage forwardly of and in communication with the smaller portion of said truncated, V-shaped feeding chamber passage and extending to the front of said device, said extruding passage being oblong in shape and extending across the axial center of said extruding portion an appreciable extent forwardly from the forward end of said feeding chamber, said feeding chamber increasing in width in a direction towards said extruding passage.

4. An extruding device for forming plastic dough into definite shape formed of a single piece of material, comprising an attaching portion having an interiorly screw-threaded portion, a cylindrical receiving chamber portion forwardly thereof, a feeding chamber portion forwardly of and in communication with said receiving chamber having a truncated, V-shaped passage, and an extruding portion having an extruding passage of the same width throughout forwardly of and in communication with the smaller portion of said truncated, V-shaped feeding chamber passage and extending to the front of said device, said extruding passage being oblong in shape and extending across the axial center of said extruding portion an appreciable extent forwardly from the forward end of said feeding chamber.

5. An extruding device for forming plastic dough into definite shape comprising an attaching portion, a receiving chamber portion forwardly thereof of substantially uniform diameter from front to rear, a feeding chamber portion forwardly of and in communication with said receiving chamber, and an extruding portion forwardly of and in communication with said feeding chamber and extending to the front of said device and having an oblong-shaped extruding passage therein, said feeding chamber being of less cross-sectional area where it meets said extruding passage than where it meets said receiving chamber, said extruding passage extending an appreciable extent forwardly from the forward end of said feeding chamber.

ARTHUR NICOLI.

REFERENCES CITED

The following references are of record in the file of this patent:

UNITED STATES PATENTS

| Number | Name | Date |
| --- | --- | --- |
| 194,954 | Chase | Sept. 11, 1877 |
| 1,477,094 | Wilson | Dec. 11, 1923 |
| 1,526,112 | Blackaller et al. | Feb. 10, 1925 |
| 1,717,620 | Page | June 18, 1929 |